（12) United States Patent
Perrow

(10) Patent No.: US 7,284,009 B2
(45) Date of Patent: Oct. 16, 2007

(54) SYSTEM AND METHOD FOR COMMAND LINE PREDICTION

(75) Inventor: Michael S. Perrow, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 671 days.

(21) Appl. No.: 10/319,004

(22) Filed: Dec. 13, 2002

(65) Prior Publication Data

US 2004/0117380 A1 Jun. 17, 2004

(51) Int. Cl.
*G06F 17/00* (2006.01)
(52) U.S. Cl. .......................................... 707/102; 707/6
(58) Field of Classification Search ................ 707/101, 707/102, 1–7, 100; 706/16, 21
See application file for complete search history.

(56) References Cited

U.S. PATENT DOCUMENTS

| 5,418,951 | A | * | 5/1995 | Damashek | ...................... 707/5 |
| 5,706,365 | A | * | 1/1998 | Rangarajan et al. | ........ 707/102 |
| 5,963,671 | A | * | 10/1999 | Comerford et al. | ......... 382/230 |
| 6,311,183 | B1 | * | 10/2001 | Cohen | ........................... 707/6 |
| 6,578,032 | B1 | * | 6/2003 | Chandrasekar et al. | ........ 707/6 |
| 2003/0033297 | A1 | * | 2/2003 | Ogawa | ........................... 707/3 |
| 2003/0200211 | A1 | * | 10/2003 | Tada et al. | ..................... 707/5 |

OTHER PUBLICATIONS

Chung et al "Dynamic power management using adaptive learning tree", IEEE 1999, pp. 274-279.*
Hirsh et al, "Learning to Personalize", ACM 2000, vol. 43, No. 8, pp. 102-106.*
Hirsh et al, "An Adaptive UNIX Command-Line Assistant", ACM 1997, pp. 542-543.*
Lee, "Accuracy of MHP/GOMS Predictions for the Task of Issuing Recurrent Commands", ACM, May 1992, pp. 105-106.*
Oly et al, "Markov Model Prediction of I/O Requests for Scientific Applications", ACM 2003, pp. 147-155.*
Garay-Vitoria et al, "Intelligent Word-Prediction to Enhance Text Input Rate", ACM 1997, pp. 241-244.*
Davison, Brian D. and Hirsh, Haym, Predicting Sequences of User Actions, 1998 *AAAI/ICML* Workshop "Predicting the Future: AI Approaches to Time-Series Analysis", pp. 1-8.
Davison, Brian D., Predicting Web Actions from HTML Content, Computer Science & Engineering Department, Lehigh University, Packard Lab, HT'02, Jun. 11-15, 2002, College Park, Maryland, pp. 1-10.
Jacobs, Nico and Blockeel, Hendrik, From Shell Logs to Shell Scripts, Katholleke Universiteit Leuven, Department of Computer Science, Celestijuenlaan 200A, B-3001 Leuven, 2001, pp. 1-11.
Davison, Brian D. and Hirsh, Haym, Experiments in UNIX Command Prediction, Department of Computer Science, Rutgers, The State University of New Jersey, Aug. 1997, pp. 1-15.

* cited by examiner

*Primary Examiner*—Uyen Le
(74) *Attorney, Agent, or Firm*—Michael C. Martensen; William J. Kubida; Hogan & Hartson LLP

(57) ABSTRACT

Systems, methods, and computer program products for command line prediction are disclosed. Commands entered on a command line are saved to a command log. The command log is analyzed to generate a plurality of n-gram tables that reflect the entries in the command log. The n-gram tables may be stored in a suitable memory. Subsequent command sequences entered on the command line may be compared to the n-gram tables to assess the likelihood of a command.

28 Claims, 11 Drawing Sheets

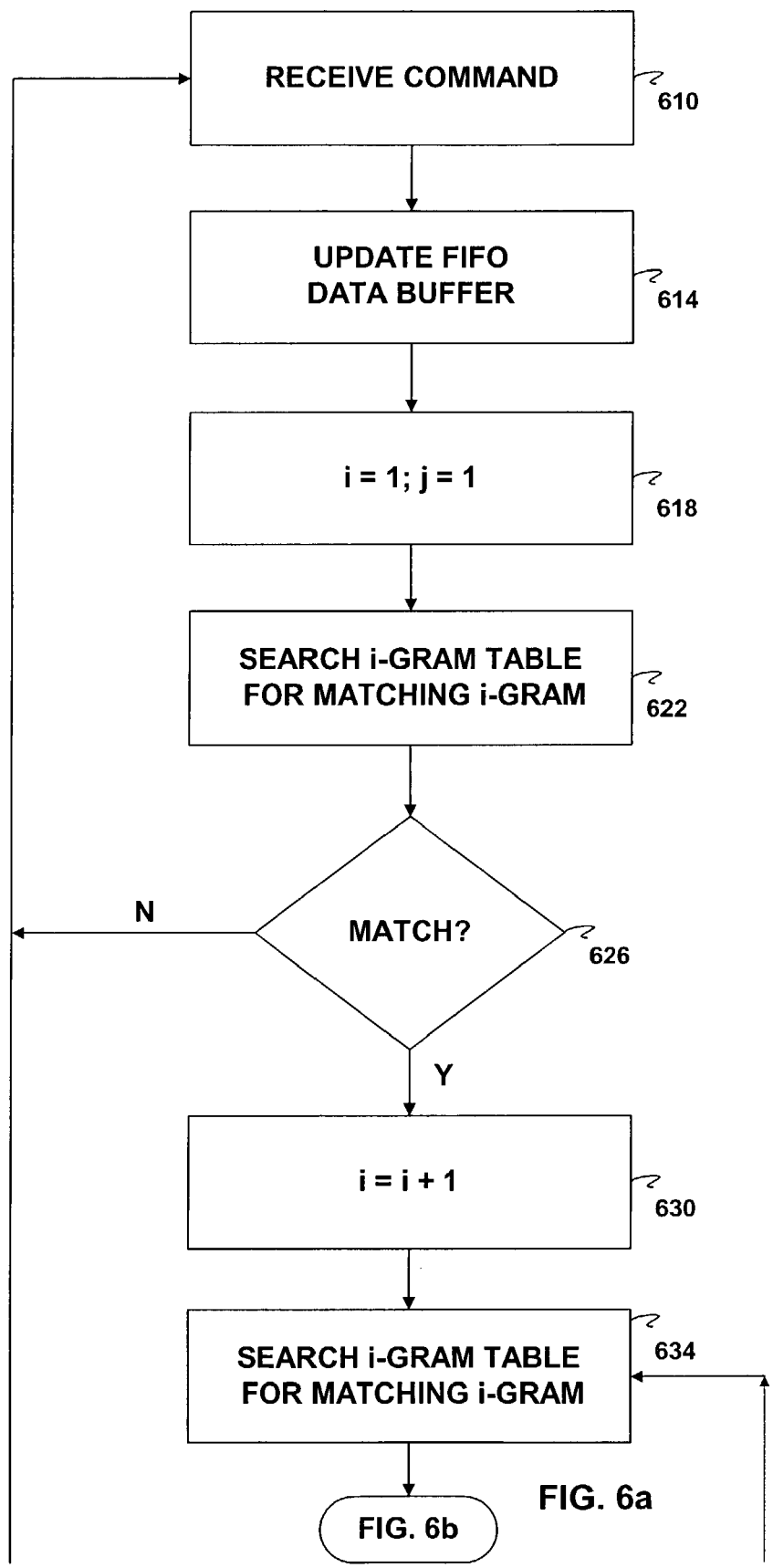

SYSTEM AND METHOD FOR COMMAND LINE PREDICTION

BACKGROUND

1. Field

The present invention relates to electronic computing, and more particularly to a system for predicting a command to be entered into a command line in a computer system.

2. Background

In some operating environments, e.g., Unix, computer users interact with a computer by entering commands into a command line. Some users may exhibit repetitive behavior entering commands into the command line. Therefore, systems and methods for predicting commands may be useful to users of computer systems.

SUMMARY

In one aspect, a method for command line prediction in a computer system is provided. The computer system includes a database of command sequences organized into tables of n-grams. The method comprises receiving an entry in a command line sequence; searching the database for an n-gram entry matching the received entry in the command line sequence; and displaying a predicted command if an n-gram entry that satisfies a certainty threshold is found in the database.

In another aspect, a method for building a database for use in command line prediction is provided. The method comprises storing commands entered by a user in a command log; generating a plurality of n-gram tables from the commands stored in the command log, wherein the n-gram tables include an indicator of the frequency with which an n-gram appears in the command log; and storing the n-gram tables in memory.

In another aspect, a computer program product for command line prediction in a computer system is provided. The computer system includes a database of command sequences organized into tables of n-grams. The computer program product comprises logic instructions, executable on a processor, for receiving an entry in a command line sequence; logic instructions, executable on a processor, for searching the database for an n-gram entry matching the received entry in the command line sequence; and logic instructions, executable on a processor, for displaying a predicted command if an n-gram entry that satisfies a certainty threshold is found in the database.

In another aspect, a system for command line prediction is provided. The system comprises a processor configured to collect commands input by a user and store the commands in a command log; a processor configured to retrieve entries from the command log and to generate a plurality of n-gram tables from the commands stored in the command log, wherein the n-gram tables include an indicator of the frequency with which an n-gram appears in the command log; a database for storing the n-gram tables; and a processor configured to receive an entry in a command line sequence input by a user, to search the database for an n-gram entry matching the received entry in the command line sequence; and to display a predicted command if an n-gram entry that satisfies a certainty threshold is found in the database.

BRIEF DESCRIPTION OF THE DRAWINGS

FIGS. 6a-6b are flowcharts illustrating a foreground process for command line prediction in an exemplary system for command line prediction;

DETAILED DESCRIPTION OF THE PREFERRED EMBODIMENTS

Figure 1:
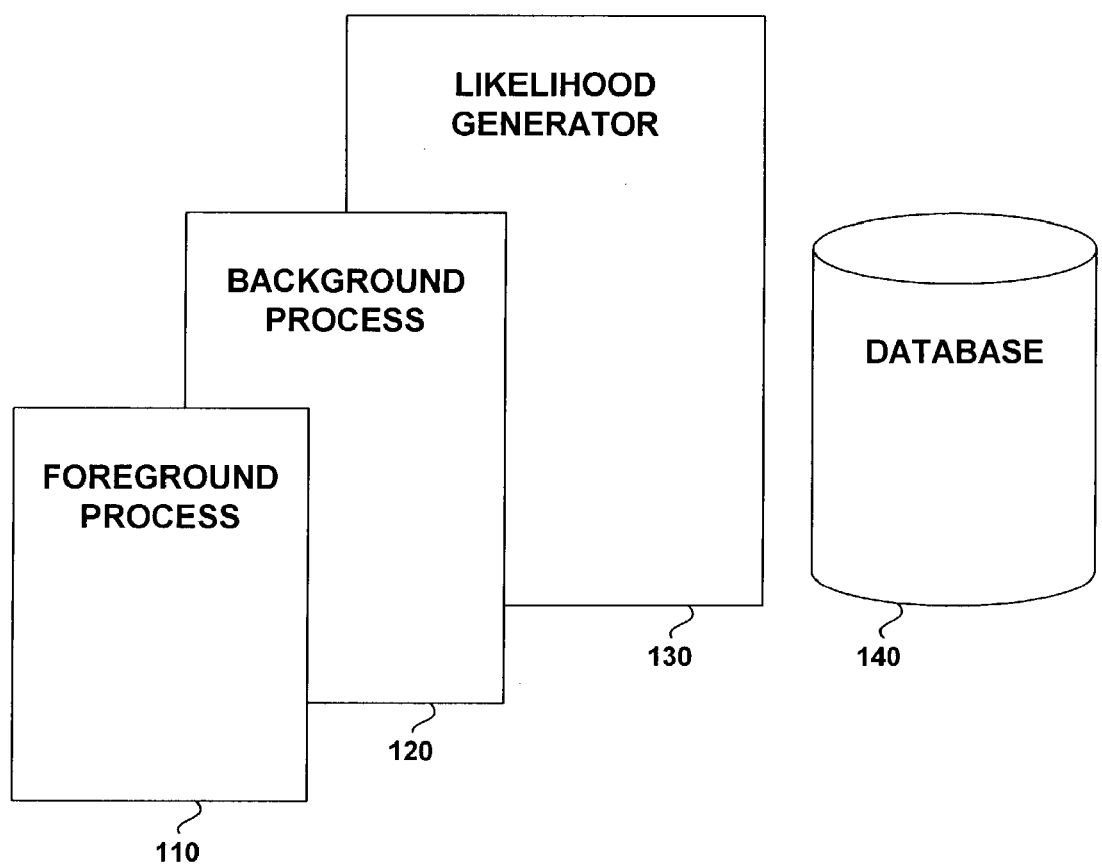
FIG. 1 is a schematic depiction of an exemplary system for command line prediction.

Referring now to FIG. 1, an exemplary system for command line prediction includes a suitable data storage area, e.g., a database 140 for storing information about commands and/or command patterns entered on the command line. The system further includes a background process 120 for analyzing commands entered on a command line and organizing data about the commands in the database 140. The system further includes a foreground process 110 that runs when commands are entered on a command line. Foreground process 110 scans the database for command sequences that match the command sequences entered on the command line and consults a likelihood generator 130 to determine whether matching command sequence(s) are sufficiently likely to be predictive of a subsequent command, and if so then the foreground process may display the predicted command near the command line. Each of these components is explained in greater detail below.

A typical series of commands entered into a UNIX shell might look like this:

```
cd mydir
ls -alt
emacs myfile
rm myfile
ls -alt
emacs myfile
./myfile
```

Each line can be separated into a table recording the command and arguments:

| Command | Arguments |
|---------|-----------|
| cd | mydir |
| ls | -alt |
| emacs | myfile |
| rm | myfile |
| ls | -alt |
| emacs | myfile |
| ./myfile | <none> |

In addition, a sequence of commands can be viewed as an n-gram. For example, the command cd mydir may be viewed as an n-gram of length 1, also referred to as a 1-gram.

The command sequence cd mydir, ls-alt, may be viewed as an n-gram of length 2, i.e., a 2-gram. Similarly, the command sequence cd mydir, ls-alt, emacs myfile can be viewed as three tokens in an n-gram of length 3, i.e., a 3-gram, and so on and so forth.

Database 140

In an exemplary embodiment a system in accordance with the present invention may be adapted to analyze command line sequence patterns of individual users on a session-by-session basis. In a UNIX operating environment, the tchs shell may be used to record the command history of a session into a command log that may be stored as a table in the database. It will be appreciated that alternate shells may be used, for example, the bourne shell (sh), the bourne again shell (bash) the korn shell (ksh), the c shell (csh, or another shell. The command log may include the UNIX command, parameters associated with the command, a sequence number, and a time stamp. The sequence number may be an integer that is incremented with each command logged during the session, i.e., 1, 2, 3, 4, etc. An exemplary command log may be structured as follows:

| Command | SequenceID | Time |
|---|---|---|
| cd mydir | 1 | 08:16 14-OCT-02 |
| ls -alt | 2 | 08:17 14-OCT-02 |
| emacs myfile | 3 | 08:17 14-OCT-02 |
| rm myfile | 4 | 08:19 14-OCT-02 |
| ls -alt | 5 | 08:19 14-OCT-02 |
| emacs | 6 | 08:19 14-OCT-02 |
| ./myfile | 7 | 08:30 14-OCT-02 |

In addition, a session log indicating when a user logged in and out of the shell may be maintained. This session log may have the following structure:

| Action | Time |
|---|---|
| login | 08:15 14-OCT-02 |
| logout | 08:40 14-OCT-02 |

In an exemplary embodiment, the system may maintain a command log and a session log for each user of the system. This should increase the accuracy of the system since individual users are more likely to exhibit repetitive command structures. However, it will be appreciated that the command and session logs need not be maintained on a per-user basis. The contents of the command log and the session log may be deleted periodically or as part of the analysis process to maintain the logs within a reasonable size range.

The Background process 120 periodically analyzes the command log(s) and the session log to populate a series of data tables of n-grams that may be stored in the database 140. The first table simply stores the total number of command sequences (i.e., the sum of each n-gram*the frequency of the n-gram). For the example entries considered above, and assuming the system is configured to collect n-grams up to length 5, the table may look as follows:

| NGramLength | Total |
|---|---|
| 1 | 7 |
| 2 | 6 |

-continued

| NGramLength | Total |
|---|---|
| 3 | 5 |
| 4 | 4 |
| 5 | 3 |

Background process 120 also populates data tables in database 140 that store the various n-grams recorded in the command log and the corresponding frequency with which the n-grams are used. In an exemplary embodiment, these data tables may be designed using a relational model that implements separate tables for each length of n-gram. Thus each table may be for an n-gram of length X, and may contain a foreign key to the table for n-grams of length X−1. For example, the table for 5-grams may include a single entry for each n-gram and a foreign key pointing to the table for the 4-gram that is a subset of the 5-gram. Similarly, the table for 4-grams may include a single entry and a foreign key pointing to the table for the 3-gram that is a subset of the 4-gram. In like fashion the table for 3-grams may refer to the table for 2-grams, which may in turn refer to the table for 1-grams. One of skill in the art will appreciate that the table for 1-grams does not need a foreign key.

By way of example, a 1-gram data tables may look as follows:

| 1-GramID | command | Frequency |
|---|---|---|
| 1 | cd mydir | 1 |
| 2 | ls -alt | 2 |
| 3 | emacs myfile | 2 |
| 4 | rm myfile | 1 |
| 5 | ./myfile | 1 |

A 2-gram data table may look as follows:

| | Foreign Key $\setminus | /$ | | |
|---|---|---|---|
| 2-GramID | 1-GramID | command | Frequency |
| 1 | 1 | ls -alt | 1 |
| 2 | 2 | emacs myfile | 2 |
| 3 | 3 | rm myfile | 1 |
| 4 | 4 | ls -alt | 1 |
| 6 | 3 | ./myfile | 1 |

A 3-gram data table may look as follows:

| | Foreign Key $\setminus | /$ | | |
|---|---|---|---|
| 3-GramID | 2-GramID | command | Frequency |
| 1 | 1 | emacs myfile | 1 |
| 2 | 2 | rm myfile | 1 |
| 3 | 3 | ls -alt | 1 |
| 4 | 4 | emacs myfile | 1 |
| 5 | 2 | ./myfile | 1 |

A 4-gram data table may look as follows:

Foreign Key
\|/

| 4-GramID | 3-GramID | command | Frequency |
|---|---|---|---|
| 1 | 1 | rm myfile | 1 |
| 2 | 2 | ls -alt | 1 |
| 3 | 3 | emacs myfile | 1 |
| 4 | 4 | ./myfile | 1 |

Figure 2:
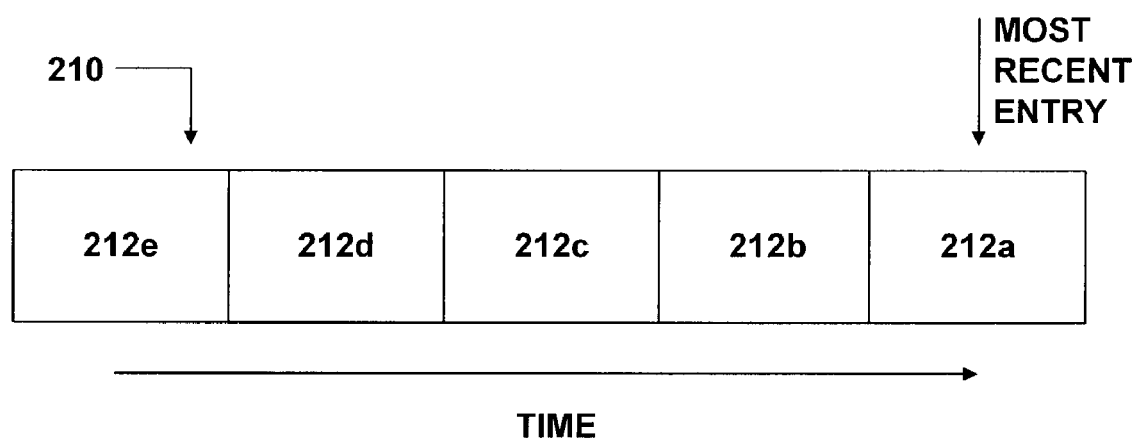
FIG. 2 is a schematic depiction of a memory structure used in an exemplary system for command line prediction.

In addition, the system implements an in-memory data structure containing up to the last MAX_LENGTH commands processed by the system. In an exemplary embodiment, the in-memory data structure may be configured as a FIFO data buffer 210, as depicted in FIG. 2. For example, if the system is configured to process 5-grams, then the in-memory data structure 210 is configured to hold 5 entries 212a-212e from the command log. Background process 120 may read entries from the command log into the FIFO data buffer 210 in a reverse chronological order, such that the most recent entry in the command log is read first. Each time a new entry is read from the command log into the FIFO data buffer 210, the entries in command log 210 are shifted to the left, such that space 212a always holds the most recent entry read from the command log, space 212b always holds the second most recent entry from the command log, space 212c always holds the third most recent entry read from the command log, space 212d always holds the fourth most recent entry read from the command log, and space 212e always holds the fifth most recent entry read from the command log. In addition, each time a new entry is read from the command log into the FIFO buffer 210, background process 120 updates the various n-gram tables in database 140, a process described in detail below.

In addition, foreground process 110 uses an in-memory data structure that is a collection of matches from the n-gram DB. This consists of a sequence of commands (the n-gram) and the frequency of the n-grams from the DB. This data structure may be a list of n-gram, frequency pairs. An exemplary entry in the data structure may be as follows:

| N-Gram | Frequency |
|---|---|
| (cd mydir,ls-alt,emacs myfile) | 1 |

Having explained the various data structures used by the system, attention will now be turned to the foreground process 110 and the background process 120, which will be explained with reference to FIG. 3 and FIG. 4, respectively. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Background Process 120

Figure 3A:
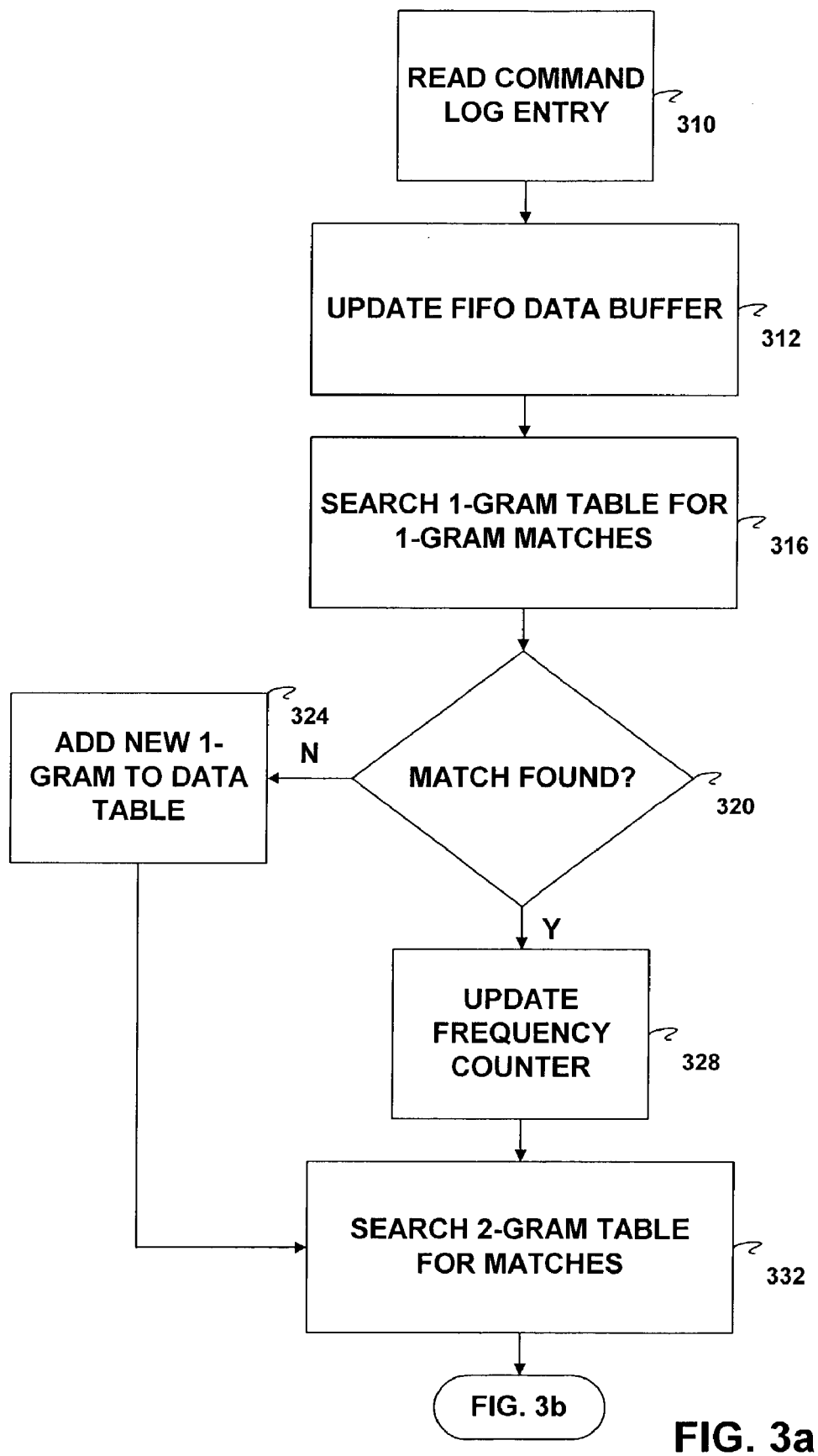
FIGS. 3a-3c are flowcharts illustrating a background process in an exemplary system for command line prediction.
Figure 3B:
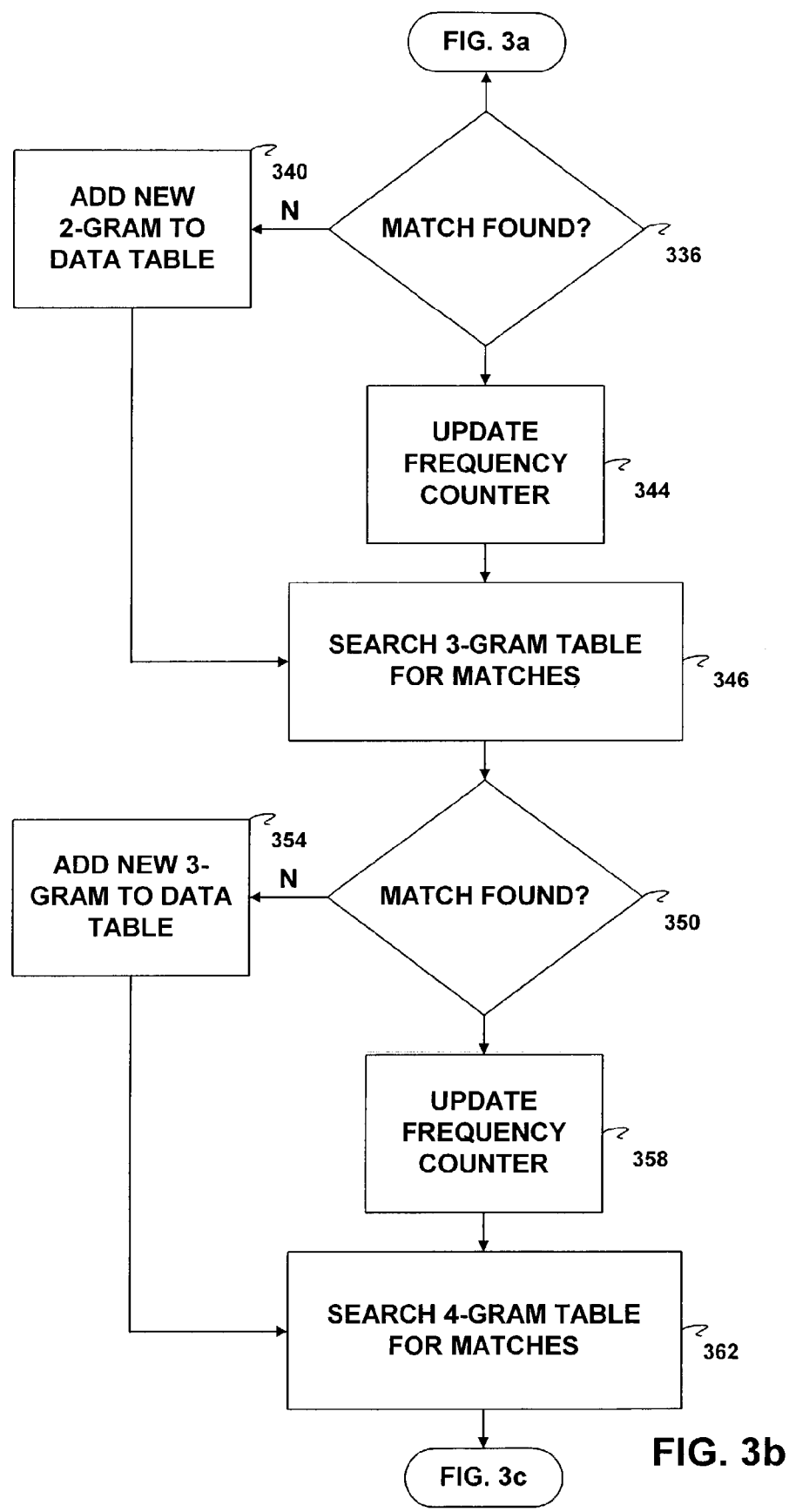
Figure 3C:
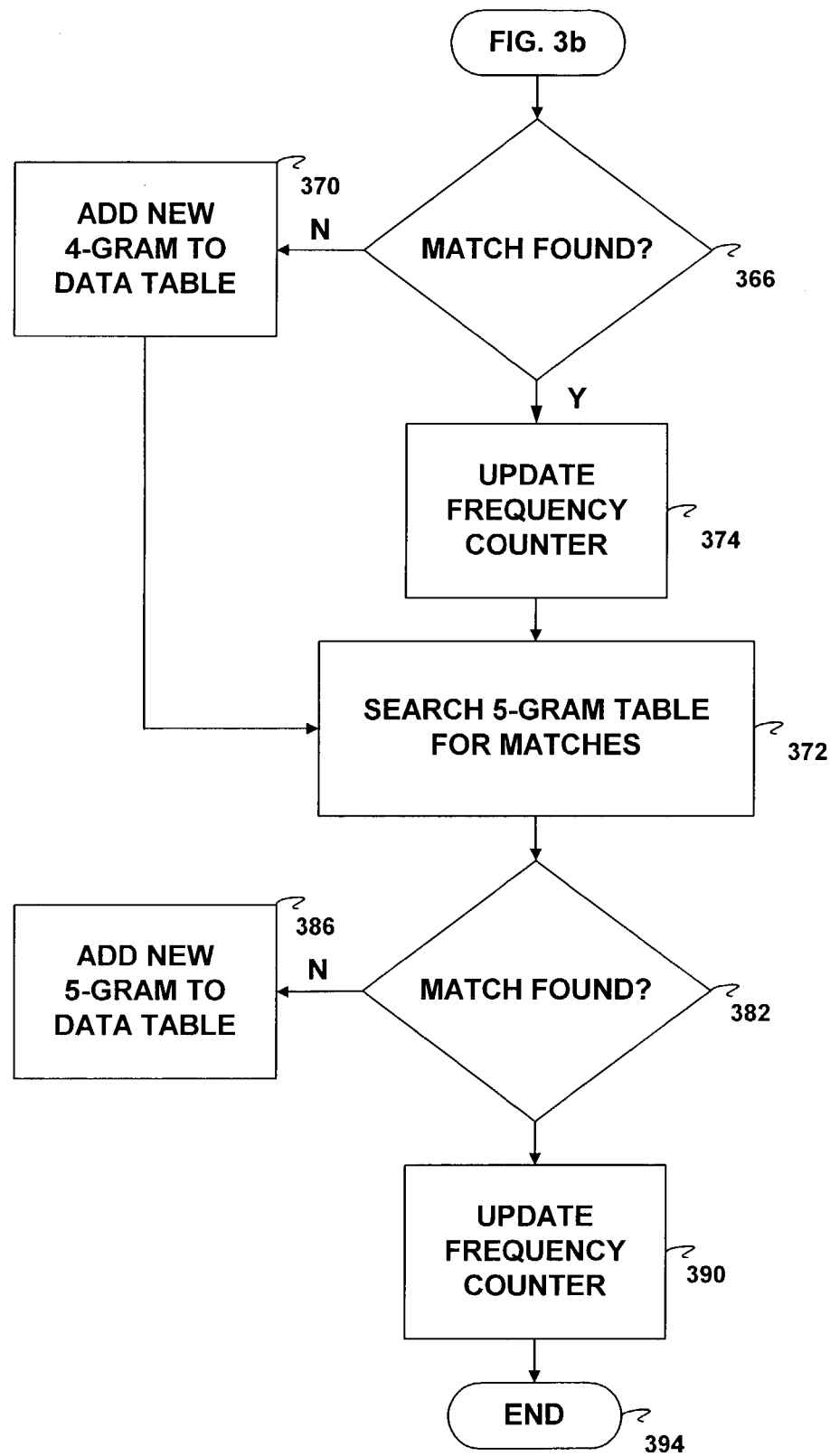

FIG. 3 is a flowchart illustrating an exemplary background process 120. This process may execute periodically or may wait until a session has been recorded in the command log and the session log before execute. Among other things, background process 120 analyzes the command log file described above to populate the various n-gram tables. In an exemplary embodiment, background process may retrieve the contents of a single session. This may be accomplished by first retrieving the login time and logout time of a session, which may then be deleted from the database. All of the entries entered in the command log during the session may be analyzed together.

FIG. 3 is a schematic illustration of a background process 120 in which the system is configured to match n-grams up to length 5. Referring to FIG. 3, at step 300 an entry is read from the command log. At step 312 the entry is entered into the first space 212a of FIFO data buffer 210 depicted in FIG. 2. At step 316 background process 120 searches the 1-gram data table in the database 140 for an entry that matches the most recent entry 212a in the FIFO data buffer 210. If no match is found at step 320, then background process 120 adds the most recent entry 212a in the FIFO data buffer 210 as a new entry in the 1-gram table at step 324. By contrast, if a match is found at step 320 then background process 120 updates the frequency counter(s) for the matching entry in the 1-gram table at step 328.

At step 332 background process 120 searches the 2-gram data table in the database 140 for an entry that matches the two most recent entries 212a, 212b in the FIFO data buffer 210. If no match is found at step 336 (FIG. 3b), then background process 120 adds the two most recent entries 212a, 212b in the FIFO data buffer 210 as a new entry in the 2-gram table at step 340. As described above, this may be accomplished by adding the second most recent entry 212b to the 2-gram table and providing a foreign key to the 1-gram table entry for the most recent entry 212a in the FIFO data buffer 210. By contrast, if a match is found at step 320 then background process 120 updates the frequency counter for the matching entry in the 2-gram table at step 344.

At step 346 background process 120 searches the 3-gram data table in the database 140 for an entry that matches the three most recent entries 212a, 212b, 212c in the FIFO data buffer 210. If no match is found at step 350, then background process 120 adds the three most recent entries 212a, 212b, 212c in the FIFO data buffer 210 as a new entry in the 3-gram table at step 354. As described above, this may be accomplished by adding the third most recent entry 212c to the 3-gram table and providing a foreign key to the 2-gram table entry for the second most recent entry 212b in the FIFO data buffer 210. By contrast, if a match is found at step 320 then background process 120 updates the frequency counter for the matching entry in the 3-gram table at step 358.

At step 362 background process 120 searches the 4-gram data table in the database 140 for an entry that matches the four most recent entries 212a, 212b, 212c, 212d in the FIFO data buffer 210. If no match is found at step 336 (FIG. 3c), then background process 120 adds the four most recent entries 212a, 212b, 212c, 212d in the FIFO data buffer 210 as a new entry in the 4-gram table at step 370. As described above, this may be accomplished by adding the fourth most recent entry 212d to the 4-gram table and providing a foreign key to the 3-gram table entry for the third most recent entry 212c in the FIFO data buffer 210. By contrast, if a match is found at step 320 then background process 120 updates the frequency counter for the matching entry in the 4-gram table at step 374.

At step 378 background process 120 searches the 5-gram data table in the database 140 for an entry that matches the five most recent entries 212a, 212b, 212c, 212d, 2123 in the FIFO data buffer 210. If no match is found at step 382, then background process 120 adds the five most recent entries 212a, 212b, 212c, 212d, 212e in the FIFO data buffer 210 as a new entry in the 5-gram table at step 386. As described above, this may be accomplished by adding the fifth most recent entry 212e to the 5-gram table and providing a foreign key to the 4-gram table entry for the fourth most recent entry 212d in the FIFO data buffer 210. By contrast, if a match is found at step 320 then background process 120 updates the frequency counter for the matching entry in the 5-gram table at step 390. The process may then terminate at step 390.

For example, the first entry is written to the 1-gram table, the second entry is written to the 2-gram table and a foreign key is set to the entry in 1-gram table, the third entry is written to the 3-gram table and a foreign key is set to the entry in the 2-gram table, the fourth entry is written to the 4-gram table and a foreign key is set to the entry in the 3-gram table, and the fifth entry is written to the 5-gram table and a foreign key is set to the entry in the 4-gram table. One of skill in the art will appreciate that a longer FIFO buffer could be used to record N-grams having a length greater than 5. In general, the FIFO buffer may be dimensioned to record up to MAX_LENGTH n-grams from length 1 to MAX_LENGTH i.e. 1 n-gram of each length.

One of skill in the art will recognize that the system need not be limited to n-grams of any particular length. In practice, the system may be implemented to match n-grams up to any arbitrary length, MAX_LENGTH. Database 140 may be updated to include an n-gram table for n-grams of length i, where i is incremented from 1 to MAX-LENGTH. FIFO data buffer 210 may be implemented as a buffer of length MAX_LENGTH. One of skill in the art will also recognize that background process 120 may be implemented as an iterative process of searching the n-gram tables for matching n-grams of length i, where i is incremented from 1 to MAX_LENGTH.

Figure 4A:
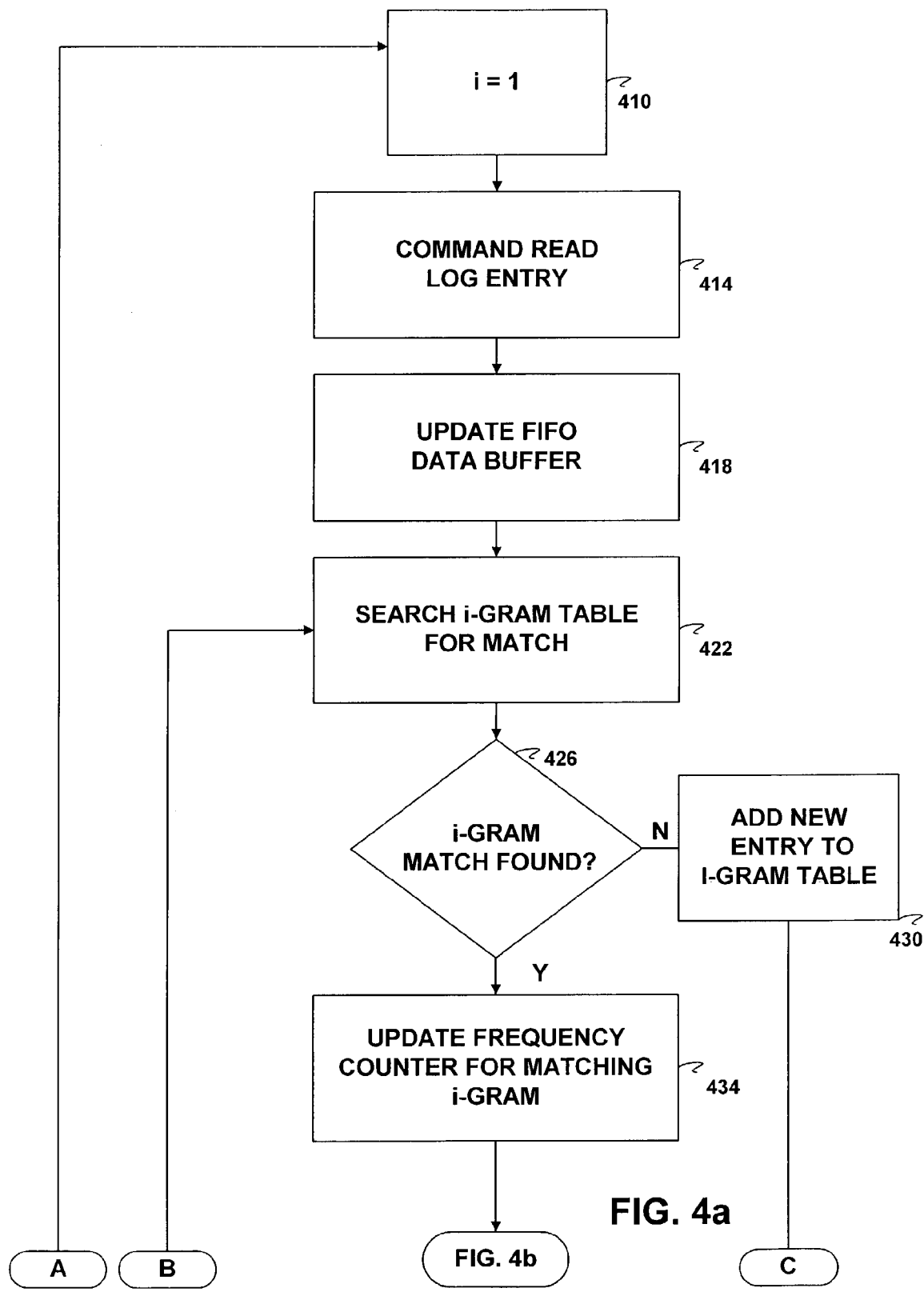
FIGS. 4-4b are flowcharts illustrating an alternate embodiment of a background process in an exemplary system for command line prediction.
Figure 4B:
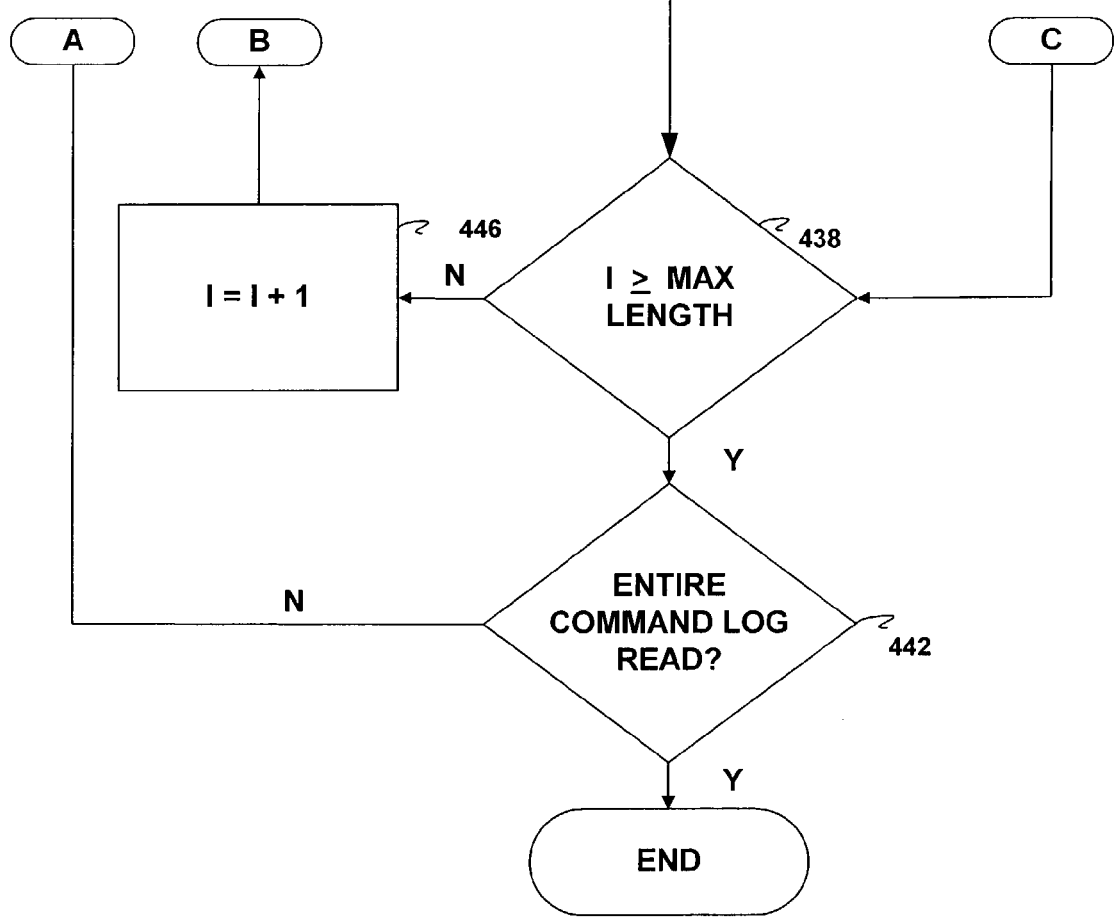

An exemplary iterative background process is illustrated in FIG. 4. At step 410 i is set to 1. At step 414 an entry from the command log is read and at step 418 the FIFO data buffer 210 is updated. In an exemplary embodiment commands from the command log are read in reverse chronological order as described in connection with FIG. 3. At step 422 background process searches the i-gram table for an entry matching the I most recent entries in FIFO data buffer 210. For example, when i=1 background process 120 searches the 1-gram table for an entry matching the most recent entry 212a in FIFO data buffer 210, and when i=2 background process 120 searches the 2-gram table for an entry matching the two most recent entries in FIFO data buffer 210. If, at step 426, no match is found in the i-gram table, then at step 430 a new entry is added to the i-gram table. By contrast, if a match is found at step 426, then the frequency counter for the matching i-gram is updated at step 434. At step 434 i is compared to MAX_LENGTH, and if I is not greater than or equal to MAX_LENGTH then i is incremented at step 446 and control passes back to step 422 to read the next entry from the command log. By contrast, if i is greater than or equal to MAX_LENGTH, then at step 442 it is determined whether the entire command log for the session has been read, and if so then background process 120 may terminate. By contrast, if the entire command log has not been read then control passes back to step 410 and the process is repeated for the next entry in the command log. This process may be repeated until the entire command log (on a desired portion thereof) has been processed.

The database comprising the n-grams may be flushed periodically. Flushing, in the data structure given above, simply means deleting records from each n-gram table that have a very low frequency count (below a certain threshold). Over long periods of time, a user will enter a lot of unique n-grams that may never contribute to a recommendation. These do not need to be stored in the database. In addition, data that is older than a given threshold may be flushed from the system.

Foreground Process 110

In an exemplary embodiment, foreground process 110 logs the commands entered by the user to the command log, searches the n-gram tables generated by the background process for potential matches, implements a likelihood algorithm to predict likely next commands, and recommend commands to the users. In addition, foreground process 110 maintains an in-memory data structure that is a listing of n-grams matching those entered by the user and the frequency with which the n-grams occur in the data tables. Foreground process 110 may be incorporated into the command shell. It will be appreciated that if a user opens multiple shells, then each shell may execute an independent foreground process, and that each foreground process may generate and maintain independent command logs.

Figure 5:
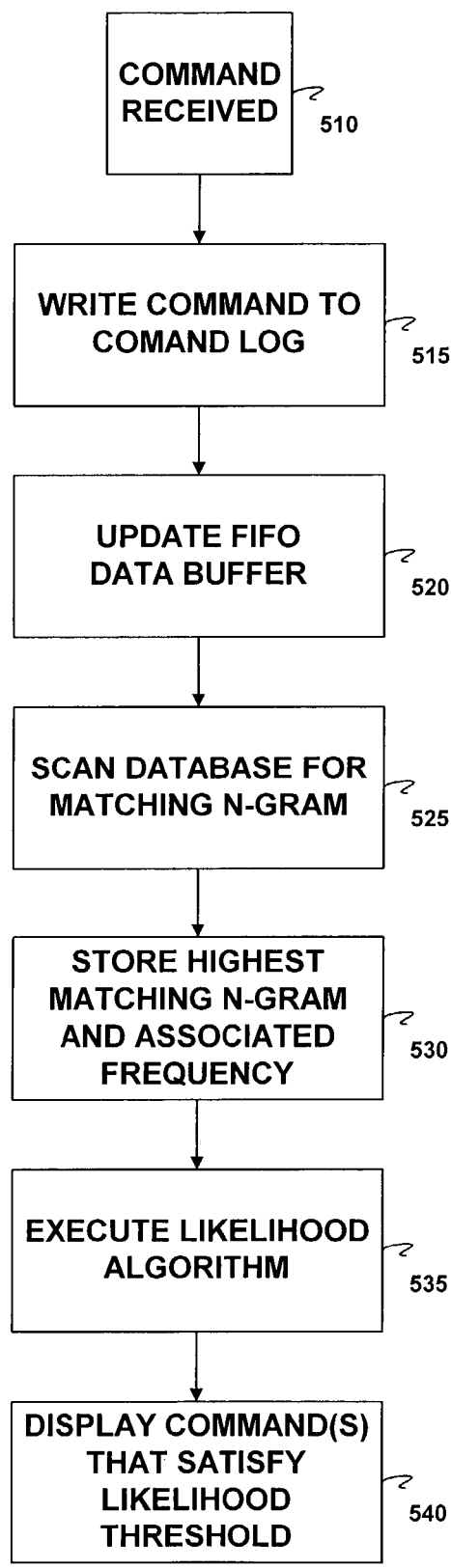
FIG. 5 is a flowchart illustrating a foreground process for command line prediction in an exemplary system for command line prediction.

FIG. 5 is a flowchart illustrating an exemplary foreground process. Referring to FIG. 5, at step 510 a command is received, e.g., as by a user entering a command on the command line. At step 515 foreground process 110 writes the command to the command log. As described above, the command log records the command and an associated sequence number, which may be assigned by the foreground process 110. In addition, the command log may include a time stamp, which may be assigned by foreground process 110.

At step 520, foreground process updates a FIFO data buffer, which may be substantially similar to FIFO data buffer 210 depicted in FIG. 2. In an exemplary embodiment, the most recently entered command may be entered into the right-most space 212a in FIFO data buffer 210. When subsequent commands are entered, the data in FIFO buffer 210 may be shifted one space to the left such that new commands are always entered in space 212a, and previous commands appear in order in spaces 212b, 212c, 212d, and 212e. It will be appreciated that the FIFO data buffer implemented by foreground process 110 may, but need not be of the same length as the FIFO data buffer utilized by background process 120.

At step 525 the various n-gram tables in the database may be scanned for matching n-grams, and at step 530 foreground process stores the highest matching n-gram(s) and their associated frequency in memory. At step 535 foreground process executes a likelihood algorithm that assesses the likelihood that the n-gram(s) are predictive of the next command to be entered by the user. At step 540 foreground process 110 displays the command(s) that satisfy a likelihood threshold.

In an exemplary embodiment, steps 525 and 530 may be implemented as an iterative search process that traverses the n-gram tables stored in the database searching for the highest-order n-gram that matches the commands stored in the FIFO data buffer 210 used by foreground process 110 and saves the matching n-gram (or information sufficient to identify it) and a frequency indicator that identifies the number of times the matching n-gram was entered in the n-gram tables.

Figure 6B:
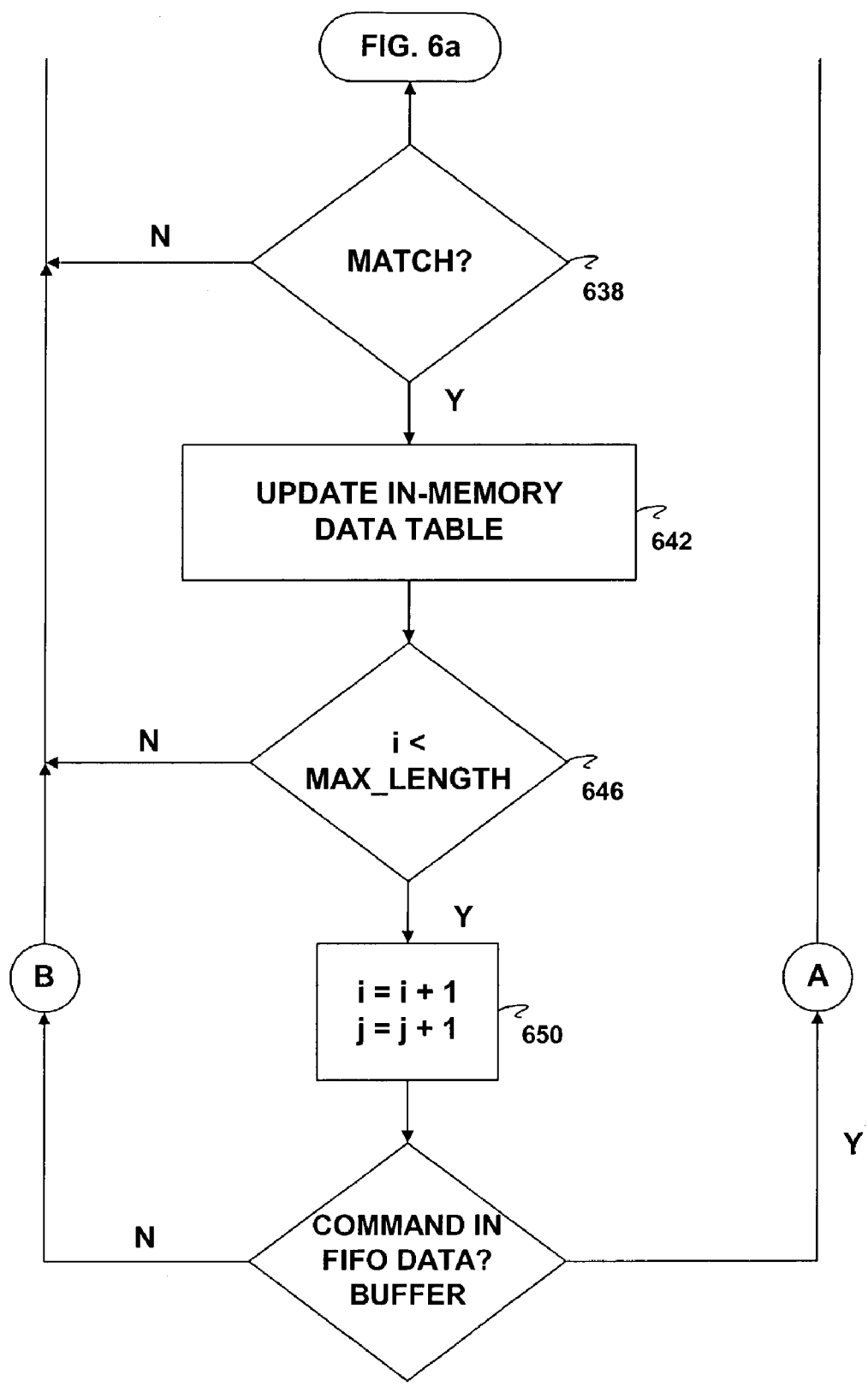

FIG. 6 is a flowchart illustrating an exemplary iterative search process. FIG. 6 assumes that FIFO data buffer is structured as an array and that commands are logged into the first element of the array as they are received, and shifted one space to make room for new commands. Thus, element 1 of the FIFO data buffer always hold the most recent command, while element 2 holds the second most recent command and element 3 holds the third most recent command, and so forth. FIFO data buffer has a maximum length of MAX_LENGTH, which may or may not be the same as the MAX_LENGTH of the FIFO data buffer used in the background process 120.

At step 610 a command is received, e.g., as when a user enters a command on the command line. At step 614 the FIFO data buffer is updated, e.g., by writing the received command into element 1 of the FIFO data buffer and shifting the existing contents one element in the array. At step 618, counters i and j are set to 1. At step 622 the 1-gram table is searched for 1-grams matching element j of the FIFO data buffer. If there is no match in the 1-gram table (step 626), then control passes back to step 610 and foreground process 110 waits for the next command to be entered. By contrast, if there is a match in the 1-gram table (step 626), then i is incremented at step 630 and control passes to step 634, wherein the i-gram table is searched for i-grams starting with element j of the FIFO data buffer. If there is no match in the i-gram table (step 638), then control passes back to step 610 and foreground process 110 waits for the next command to be entered. By contrast, if there is a match at step 638, then information identifying the i-gram and its frequency indicator are stored in a memory at step 642. At step 646 i is compared to MAX_LENGTH, and if i is greater than or equal to MAX_LENGTH, then control passes back to step 610 and foreground process 110 waits for the next command to be entered. By contrast, if i is less than MAX_LENGTH, then i and j are incremented (step 650) and control passes to step 654. Where the FIFO date buffer is examined to determine whether there is another command in the queue to process. If there is another command in the queue, then control passes to Step 634, and the process checks the next-highest i-gram table. This iterative process traverses the n-gram tables populated by background process 120 to find the highest-order n-grams matching the commands stored in the FIFO data buffer.

FIG. 6 will now be discussed in greater detail for purposes of clarity. Assuming that the system has been configured to analyze n-grams of length 5, the background process will populate tables for 1-grams, 2-grams, 3-grams, 4-grams, and 5-grams in the database 140. Foreground process 110 may be configured to traverse some or all of the n-gram tables to generate predictions for likely next commands.

Assuming a user has just initiated a new session, at step 610 the user enters the first command in the command line. Foreground process updates a FIFO data buffer by placing this command in the first element of the data buffer at step 614. At step 618 counters i and j are set to 1. At step 622 the 1-gram table is searched for an entry corresponding to the command in the first entry of the FIFO data buffer, which may be designated as $Command_j$. If the search process yields a match in the 1-gram table (step 626), then i is incremented to 2 at step 630. At step 634 the 2-gram table is searched for entries beginning with $Command_1$. If there is a match (step 638), then the 2-grams beginning with $Command_1$ and their associated frequency information may be retrieved from the 2-gram table and saved in an in-memory data structure (at step 642). At step 646 the counter i, which holds the value 2, is less than MAX_LENGTH so control passes to step 650, and i is incremented to 3 and j is incremented to 2. At step 654 the FIFO data buffer is examined to determine whether there is an entry in the second element, which is empty at this time. Accordingly, control passes back to step 610 and the foreground process waits for the user to enter the next command.

When the user enters the second command, the command is received at step 610, and at step 614 the FIFO data buffer is updated, e.g., by shifting the first command one space and writing the second command into the FIFO data buffer. At step 618 i and j are initialized to 1. At step 622 the 1-gram table is searched for 1-grams corresponding to the first entry in the FIFO data buffer, i.e., $Command_1$. If no match is found (step 622) then control passes back to step 610 and the foreground process 110 waits for the next command to be entered. By contrast, if a match is found in the 1-gram table then i is incremented (step 630) to 2 and at step 634 the 2-gram table is searched for entries that correspond to the first entry in the FIFO data buffer. These entries represent a 2-gram having the form of $\{Command_1, X\}$, where X is a wildcard. If there are no matches in the 2-gram table, then control passes back to step 610. By contrast, if there are one or more matches, then at step 642 the matching 2-grams and their corresponding frequency values are written to an in-memory data structure maintained by the foreground process. At step 646 the counter i, the value of which is 2, is less than MAX_LENGTH so control passes to step 650, which increments i to 3 and j to 2. At step 654 there is a $Command_2$ in the FIFO data buffer, so control passes to step 634, where the 3-gram table is searched for 3-grams having the form $\{Command_2, Command_1, X\}$, where X is a wildcard. In an exemplary embodiment, this search may be performed by first searching the 3-gram table for all entries beginning with $Command_2$, then selecting from this set the entries having a foreign key to an entry in the 2-gram table having the format $\{Command_1, X\}$, resulting in one or more entries from the 3-gram table having the form $\{Command_2, Command_1, X\}$. If there were no matches in the 3-gram table (step 638), then control passes back to step 610. By contrast, if there was a match, then the in-memory data table is updated at step 642. In an exemplary embodiment, foreground process 110 logs the highest-order n-gram match. Therefore, the matching entries from the 3-gram table having the form $\{Command_2, Command_1, X\}$ may be written over the matches from the 2-gram table having the form $\{Command_1, X\}$. At step 646 i, which hold the value of 3, is less than MAX_LENGTH so control passes to step 650 and i is incremented to a value of 4 and j is incremented to a value of 3. At step 654 there is no command in the third element of the FIFO data buffer so control passes to step 610.

When the third command entered by the user is received at step 610 the FIFO data buffer is updated at step 614, e.g., by shifting its contents and adding the most recent command to the end of the buffer (i.e., $Command_1$). The counters i and j are initialized to 1 at step 618 and the 1-gram table is searched for an entry that has the form $\{Command_1\}$ and if no match is found then control passes back to step 610. By contrast, if a match is found at step 622, then steps 634 through 654 are repeated so that the 2-gram table is searched for entries having the form $\{Command_1, X\}$, and if a match is found then the 3-gram table is searched for entries having the form $\{Command_1, Command_2, X\}$, and if a match is found then the 4-gram tables are searched for entries having the form $\{Command_1, Command_2, Command_3, X\}$. The highest-order matches and their associated frequencies are written to the in-memory data structure at step 642.

The process may be repeated when the user enters the fourth command. The search process traverses the i-gram tables, and matches are found in the 1-gram, 2-gram, 3-gram, and 4-gram tables, the search ultimately traverses the 5-gram table for entries having the form $\{Command_1, Command_2, Command_3, Command_4, X\}$. The highest-order matches and their associated frequencies are written to the in-memory data structure at step 642.

One of skill in the art will recognize numerous variations on the data structures and data flows described herein as mere matters of design choice. For example, FIFO data buffers may be filled from left to right, or from right to left.

Command Likelihood Algorithm

An exemplary command line prediction system employs an algorithm to assess the likelihood the next command based on the most recent command(s) input from the user. A command likelihood algorithm may take a list of n-gram matches with their frequencies, and calculate the likelihood of each match being correct for the next command. An exemplary algorithm may calculate the likelihood of an n-gram as proportional to it's frequency divided by the total number of n-grams of that length. Expressed as a formula, the algorithm may determine:

$$L = a * F/T$$

Where:
L=Likelihood of the n-gram.
F=Frequency of the n-gram.
T=Total number of n-grams of this length.
A=A small constant. 0<a<1

The constant A may be used to represent the uncertainty of the problem. If the likelihood of a match exceeds a certain threshold, then the predicted command(s) may be displayed on or near the command line for a user to select. The likelihood threshold may be set by the designer of the system, or by the user of the system, e.g., as a parameter. Lowering the likelihood threshold should increase the number of false positives returned by the prediction system. By contrast, increasing the likelihood threshold will reduce false positives, but may also cause the system to fail to display correct matches that did not meet the threshold.

Alternate embodiments of the likelihood algorithm may implement additional predictive features. For example, the likelihood threshold may be adjusted based on the length of the n-gram. In an exemplary embodiment, the likelihood threshold may be inversely proportional to the length of the n-gram match. This accommodates for the fact that the likelihood of finding a matching n-gram in the data tables is also inversely proportional to the length of the n-gram. For example, in any search there should be many more 2-grams matches than 5-gram matches.

In another embodiment, the system may ignore commands that are separated by an amount of time that exceeds a threshold. This recognizes that the predictive value of a command being entered is affected by the time between the command being entered and the previous command being entered. For example, if a user enters two commands 'quick-fire', then they are likely related. By contrast, if the user pauses for 30 minutes between commands, then perhaps the system should not consider this as an n-gram, and instead start from scratch with a 1-gram on the second command being entered. The time threshold may be set by the system designer or by the user of the system as a parameter.

In addition, if the user ends his or her session, then the system may also end its session. When a user's session ends, the background process may treat this as the end of any n-grams taken from the command log.

In another embodiment, the system may log a user's response to recommendations allow the system to be more intelligent about when not to bother recommending a command. For example, if a user always ignores a certain recommendation, then the system may stop making that recommendation.

In the embodiment described above, the system was configured to log and compare both commands and arguments. In an alternate embodiment, the system may be configured to record and compare only commands, rather than both commands and arguments. In yet another embodiment, the system may be configured to record commands with arguments and without arguments, in parallel. The recommended output of each may be compared and matched to give a better recommendation.

Figure 7:
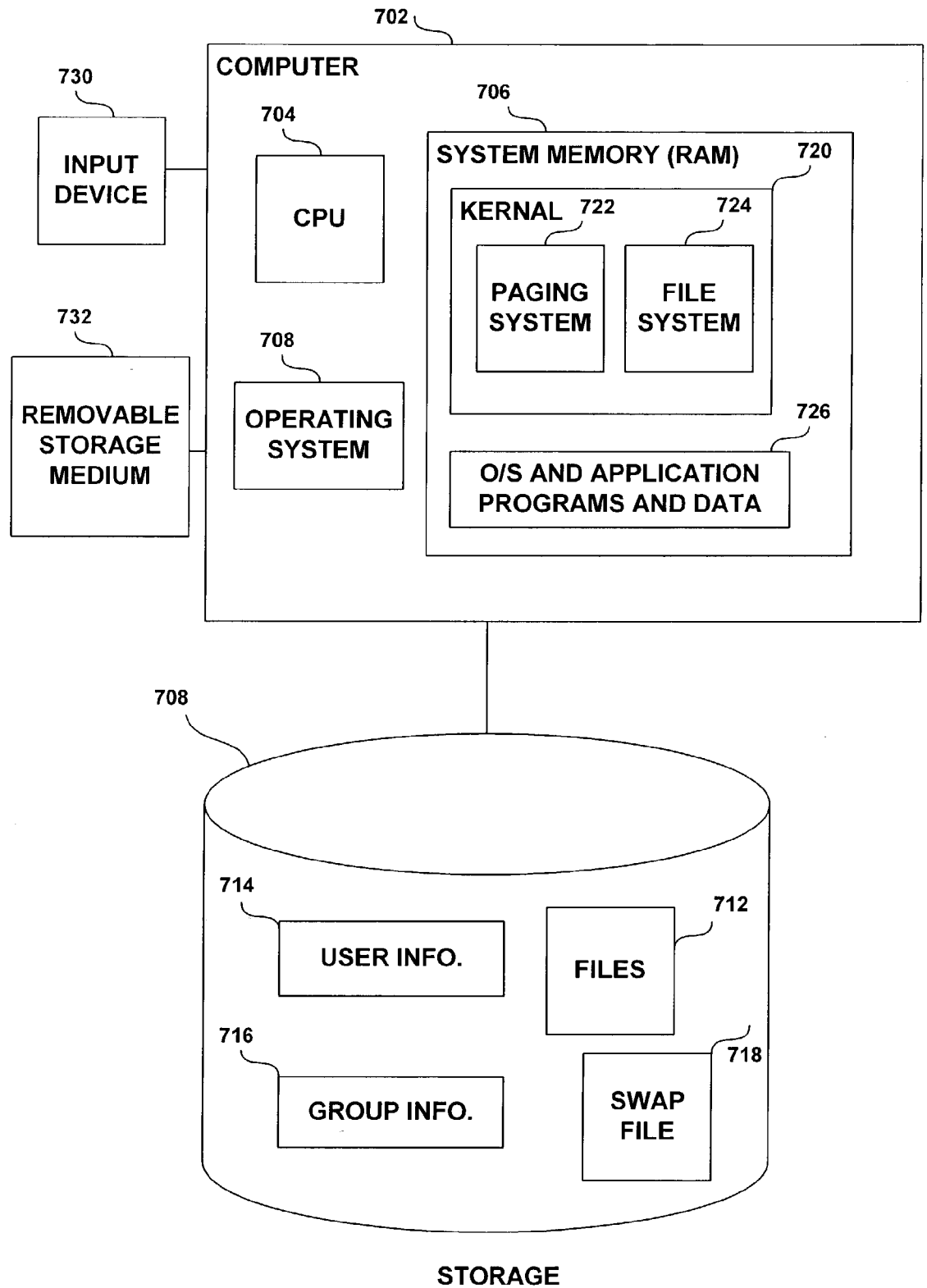
FIG. 7 is a schematic depiction of an exemplary computer system on which an exemplary system for command line prediction may be implemented.

FIG. 7 is a schematic illustration of an exemplary computing environment in which a system for command line prediction may be implemented. A computer 702, which may comprise any computing device known in the art, including a desktop computer, mainframe, workstation, personal computer, hand held computer, palm computer, laptop computer, telephony device, network appliance, etc., includes a central processing unit (CPU) 704 and system memory 706, which is typically implemented as a volatile memory device, e.g., a random access memory (RAM), static random access memory (SRAM), dynamic random access memory (DRAM), etc. The computer 702 is capable of accessing a storage system 708, which may comprise one or more hard disk drives or any other non-volatile storage devices known in the art. The storage 708 includes an operating system 710, files 712, user information 714 providing individual user login information, group information 716 providing information for groups of users, and a swap file 718 used during virtual memory operations. The storage 708 may comprise a local storage space and/or a network storage space. For instance, the swap file 718 is typically located in local storage space, however, the operating system 710, files 712, user information 714, and group information 716 may be located on local and/or network storage space.

After initialization, the operating system 710 loads essential services and programs required by other parts of the operating system and applications into an area of the system memory 6 referred to as a kernel 720. The operating system 710 may comprise any operating system program known in the art, e.g., Solaris, Windows, etc. Typically, the kernel 720 is responsible for memory management, process and task management, and disk management. The kernel 720 further includes a paging system 722 and a file system 724. The paging system 722 implements a virtual memory system that is capable of swapping data between the memory 706 to the swap file 718 in local storage 708 in a manner known in the art to increase the available space of the system memory 706. The file system 724 comprises the operating system component that organizes and provides access to files in a manner known in the art, such as providing a hierarchical file system using directories to organize files into a tree structure. The system memory 706 further includes additional operating system and application programs and data 726.

An input device 730 may comprise any user activated input means, such as a microphone, keyboard, mouse, pen stylus, etc., through which a user may enter data to the computer 702. The computer 702 is further capable of accessing data in a removable storage medium 732, such as a removable magnetic disk (e.g., floppy disk, ZIP disk, JAZ disk), removable optical disk (e.g., CD-ROM, DVD, etc.), a Personal Computer Memory Card International Association (PCMCIA) card, removable flash card, etc., in a manner known in the art.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A method for command line prediction in a computer system including a database of command sequences organized into tables of n-grams, comprising:
    receiving an entry in a command line sequence;
    searching the database for an n-gram entry matching the received entry in the command line sequence; and
    displaying a predicted command if an n-gram entry that satisfies a certainty threshold is found in the database.

2. The method of claim 1, wherein receiving an entry in a command line sequence comprises receiving a single command.

3. The method of claim 1, wherein receiving an entry in a command line sequence comprises storing the entry in a command line sequence in memory.

4. The method of claim 1, wherein searching the database for an n-gram entry matching the received entry in the command line sequence comprises searching for a 1-gram entry that matches the received entry.

5. The method of claim 4, wherein the command line sequence includes at least the two most recent commands entered at the command line and wherein matching 1-gram entries are used to search a 2-gram table for entries that match the two most recent commands entered at the command line.

6. The method of claim 5, wherein the command line sequence includes at least the three most recent commands entered at the command line and wherein matching 2-gram entries are used to search a 3-gram table for entries that match the two most recent commands entered at the command line.

7. The method of claim 6, wherein the command line sequence includes at least the four most recent commands entered at the command line and wherein matching 4-gram entries are used to search a 4-gram table for entries that match the two most recent commands entered at the command line.

8. The method of claim 7, wherein the command line sequence includes at least the five most recent commands entered at the command line and wherein matching 4-gram entries are used to search a 5-gram table for entries that match the two most recent commands entered at the command line.

9. The method of claim 1, further comprising determining a likelihood that the matching n-grams are predictive of the next command wherein the likelihood is inversely proportional to the length of the n-gram match.

10. The method of claim 1, further comprising determining a likelihood that the matching n-grams are predictive of the next command wherein the likelihood is a function of the frequency of the matching n-grams and the total number of matching n-grams of that corresponding length.

11. A computer program product for command line prediction in a computer system including a database of command sequences organized into tables of n-grams, comprising:
    logic instructions, executable on a processor, for receiving an entry in a command line sequence;
    logic instructions, executable on a processor, for searching the database for an n-gram entry matching the received entry in the command line sequence; and
    logic instructions, executable on a processor, for displaying a predicted command if an n-gram entry that satisfies a certainty threshold is found in the database.

12. The computer program product of claim 11, wherein logic instructions for receiving an entry in a command line sequence comprise logic instructions for receiving a single command.

13. The computer program product of claim 11, wherein logic instructions for receiving an entry in a command line sequence comprise logic instructions for storing the entry in a command line sequence in memory.

14. The computer program product of claim 11, wherein logic instructions for searching the database for an n-gram entry matching the received entry in the command line sequence comprise logic instructions for searching for a 1-gram entry that matches the received entry.

15. The computer program product of claim 14, wherein the command line sequence includes at least the two most recent commands entered at the command line and wherein matching 1-gram entries are used to search a 2-gram table for entries that match the two most recent commands entered at the command line.

16. The computer program product of claim 15, wherein the command line sequence includes at least the three most recent commands entered at the command line and wherein matching 2-gram entries are used to search a 3-gram table for entries that match the two most recent commands entered at the command line.

17. The computer program product of claim 16, wherein the command line sequence includes at least the four most recent commands entered at the command line and wherein matching 4-gram entries are used to search a 4-gram table for entries that match the two most recent commands entered at the command line.

18. The computer program product of claim 17, wherein the command line sequence includes at least the five most recent commands entered at the command line and wherein matching 4-gram entries are used to search a 5-gram table for entries that match the two most recent commands entered at the command line.

19. The computer program product of claim 11, further comprising determining logic instructions for a likelihood that the matching n-grams are predictive of the next command wherein the likelihood is inversely proportional to the length of the n-gram match.

20. The computer program product of claim 11, further comprising determining logic instruction for a likelihood that the matching n-grams are predictive of the next command wherein the likelihood is a function of the frequency of the matching n-grams and the total number of matching n-grams of that corresponding length.

21. A system for command line prediction, comprising:
a processor configured to collect commands input by a user and store the commands in a command log;
a processor configured to retrieve entries from the command log and to generate a plurality of n-gram tables from the commands stored in the command log, wherein the n-gram tables include an indicator of the frequency with which an n-gram appears in the command log;
a database for storing the n-gram tables; and
a processor configured to receive an entry in a command line sequence input by a user, to search the database for an n-gram entry matching the received entry in the command line sequence; and to display a predicted command if an n-gram entry that satisfies a certainty threshold is found in the database.

22. The system of claim 21, wherein the processor is configured to search the database for an n-gram entry matching the received entry in the command line sequence comprises searching for a 1-gram entry that matches the received entry.

23. The system of claim 22, wherein the command line sequence includes at least the two most recent commands entered at the command line and wherein matching 1-gram entries are used to search a 2-gram table for entries that match the two most recent commands entered at the command line.

24. The system of claim 23, wherein the command line sequence includes at least the three most recent commands entered at the command line and wherein matching 2-gram entries are used to search a 3-gram table for entries that match the two most recent commands entered at the command line.

25. The system of claim 24, wherein the command line sequence includes at least the four most recent commands entered at the command line and wherein matching 4-gram entries are used to search a 4-gram table for entries that match the two most recent commands entered at the command line.

26. The system of claim 25, wherein the command line sequence includes at least the five most recent commands entered at the command line and wherein matching 4-gram entries are used to search a 5-gram table for entries that match the two most recent commands entered at the command line.

27. The system of claim 21, further comprising a processor configured to determine a likelihood that the matching n-grams are predictive of the next command wherein the assigned likelihood is inversely proportional to the length of the n-gram match.

28. The system of claim 21, further comprising determining logic instruction for a likelihood that the matching n-grams are predictive of the next command wherein the likelihood is a function of the frequency of the matching n-grams and the total number of matching n-grams of that corresponding length.

* * * * *

UNITED STATES PATENT AND TRADEMARK OFFICE
CERTIFICATE OF CORRECTION

PATENT NO. : 7,284,009 B2  Page 1 of 1
APPLICATION NO. : 10/319004
DATED : October 16, 2007
INVENTOR(S) : Michael S. Perrow It is certified that error appears in the above-identified patent and that said Letters Patent is hereby corrected as shown below:

Column 16, line 26, delete "assigned"

Signed and Sealed this

Twenty Second Day of April, 2008

JON W. DUDAS
*Director of the United States Patent and Trademark Office*